(12) United States Patent
Boettcher et al.

(10) Patent No.: US 11,409,380 B2
(45) Date of Patent: Aug. 9, 2022

(54) HUMAN MACHINE INTERFACE SYSTEM

(71) Applicant: KORDTECH PTY LTD, Fyshwick (AU)

(72) Inventors: William Boettcher, Fyshwick (AU); Bruce MacDonald, Fyshwick (AU)

(73) Assignee: Kordtech PTY LTD, Fyshwick (AU)

( * ) Notice: Subject to any disclaimer, the term of this patent is extended or adjusted under 35 U.S.C. 154(b) by 0 days.

(21) Appl. No.: 17/189,158

(22) Filed: Mar. 1, 2021

(65) Prior Publication Data

US 2021/0208706 A1  Jul. 8, 2021

Related U.S. Application Data

(63) Continuation of application No. 16/332,952, filed as application No. PCT/AU2017/051040 on Sep. 25, 2017, now Pat. No. 10,976,841.

(30) Foreign Application Priority Data

Sep. 25, 2016  (AU) .................. 2016903879

(51) Int. Cl.
*G06F 3/0354* (2013.01)
*H04W 4/80* (2018.01)
(Continued)

(52) U.S. Cl.
CPC .......... *G06F 3/03547* (2013.01); *G06F 3/017* (2013.01); *G06F 3/02* (2013.01); *G06F 3/0202* (2013.01); *G06F 3/0338* (2013.01); *G06F 3/0383* (2013.01); *G06F 3/0489* (2013.01); *G06F 3/04883* (2013.01); *G06F 3/04886* (2013.01); *G06F 15/00* (2013.01); *H04W 4/80* (2018.02); *G06F 2203/0384* (2013.01); *G06F 2203/04808* (2013.01)

(58) Field of Classification Search
CPC ...... G06F 3/0338; G06F 3/017; G06F 3/0383; G06F 3/04883; G06F 3/03547; G06F 3/02; G06F 15/00; G06F 3/0489; G06F 3/0202; G06F 3/04886; G06F 2203/0384; G06F 2203/04808; H04W 4/80
See application file for complete search history.

(56) References Cited

U.S. PATENT DOCUMENTS 9,152,185 B2  10/2015  Karakotsios et al.
9,280,207 B2   3/2016  Graumann et al.
(Continued)

FOREIGN PATENT DOCUMENTS

AU  2004100131   3/2004
CN  101667060 A  3/2010
(Continued)

*Primary Examiner* — Deeprose Subedi
(74) *Attorney, Agent, or Firm* — Knobbe, Martens, Olson & Bear, LLP

(57) ABSTRACT

A human machine interface system for controlling a device comprising: a housing; a human digit activatable physical element; a processor in communication with the element, the processor to receive and process an input from the element; a communicator to communicate an output from the processor wherein the output comprises a command intended for the device; wherein the element, the processor and the communicator are all disposed about or within the housing or connected thereto.

17 Claims, 14 Drawing Sheets

(51) Int. Cl.
  *G06F 3/0338* (2013.01)
  *G06F 3/04883* (2022.01)
  *G06F 3/02* (2006.01)
  *G06F 3/038* (2013.01)
  *G06F 3/0489* (2022.01)
  *G06F 15/00* (2006.01)
  *G06F 3/01* (2006.01)
  *G06F 3/04886* (2022.01)

(56) References Cited

U.S. PATENT DOCUMENTS

| | | |
|---|---|---|
| 2004/0041723 A1 | 3/2004 | Shibamiya et al. |
| 2006/0209024 A1 | 9/2006 | Gharsalli |
| 2008/0126975 A1 | 5/2008 | Belkin et al. |
| 2008/0270940 A1* | 10/2008 | Chang ................ G06F 3/04886 715/823 |
| 2008/0306614 A1 | 12/2008 | Burrell, IV |
| 2009/0174994 A1 | 7/2009 | Merz |
| 2009/0239578 A1 | 9/2009 | Kuo |
| 2009/0312847 A1 | 12/2009 | Burrell, IV |
| 2010/0117966 A1 | 5/2010 | Burrell, IV |
| 2010/0189887 A1 | 7/2010 | Nielsen et al. |
| 2011/0285551 A1 | 11/2011 | Xu et al. |
| 2014/0086124 A1 | 3/2014 | Knowles |
| 2016/0224973 A1 | 8/2016 | Van Os et al. |

FOREIGN PATENT DOCUMENTS

| | | |
|---|---|---|
| JP | 2006-311252 | 11/2006 |
| JP | 2010-015598 | 1/2010 |
| JP | 2015-228062 | 12/2015 |
| KR | 10-2014-0115656 A | 10/2014 |
| WO | WO 2003/007117 | 1/2003 |
| WO | WO 2004/111823 | 12/2004 |
| WO | WO 2014/043758 | 3/2014 |
| WO | WO 2016/063083 | 4/2016 |

* cited by examiner 3D view

200

Top view

```
                                    1300

1301                                    1302

If first input is              If first input
            dot:                         is dash:

┌───────┬───────┐              ┌───────┬───────┐
If dot    If dash   If 500ms   If dot     If dash    If 500ms elapses
follows,  follows,  elapses    follows,   follows,   without input, turn
turn on   turn off  without    change     turn on    off laser
flashlight flashlight input,   radio      radio
                    turn on    volume     channel
                    laser
```

Figure 13

HUMAN MACHINE INTERFACE SYSTEM

RELATED APPLICATIONS

This application is a continuation of U.S. application Ser. No. 16/332,952 filed Mar. 13, 2019, which claims the benefit of International Application No. PCT/AU2017/051040 filed Sep. 25, 2017, which claims the benefit of Australian Application No. 2016903879 filed Sep. 25, 2016, each of which is hereby incorporated by reference in its entirety.

BACKGROUND OF THE INVENTION

Emergency services, police and military personnel typically carry a variety of disparate electronic devices, gadgets and/or instruments which each have a different user interface. Examples include radios, flashlights, laser designators, thermal weapon sights (TWS), global positioning systems (GPS), infrared scopes, computer terminals, etc. The need to master and operate multiple different user interfaces is onerous, particularly in extreme conditions (e.g. battle or an emergency incident) that impose high physical and cognitive loads on the operative. In particular, the loss of an operative's cognitive awareness while switching between different user interfaces is a potentially deadly risk. Increasingly, operatives in other fields of endeavour also have carry multiple electronic devices which require simplified operation, including construction workers, field technicians, surveyors, tradesmen, etc.

To accommodate the foregoing requirements, a method and apparatus that collapses a variety of heterogeneous controls and interfaces into one homogenous and consistent interface is required. Furthermore, a need exists for the bandwidth of said interface to be scalable, such that an interface with fewer suitably simple input combinations can be utilised where fewer functions require control, whilst a higher bandwidth interface with more suitably simple input combinations can be provided where a larger number of functions require control.

Although the bandwidth of an interface can always be increased simply by providing more user inputs, increasing the number of inputs will always result in a corresponding increase to at least one of the following properties of the interface: physical size, number of digits required for operation or cognitive load associated with operation. As previously noted, reducing induced cognitive load in battle or emergency situations is critical. In addition, for applications such as a control interface mounted to a service weapon, the space available for mounting and the number of digits available for operation are both at a premium.

There has traditionally been concern in using wireless protocols to operate instruments in certain risky or sensitive environments. For example military users are concerned that wireless activation of a device may allow a wearer to be detected by the enemy, or trigger an explosive device such as an Improvised Explosive Device (IED), or be susceptible to jamming or being controlled by an enemy. Others have been concerned about the reliability of wireless control in sensitive environments which may for example already have a large electromagnetic radiation load. In addition, wireless communication hardware consumes more electrical power than physically connected hardware, since the controlled device must periodically check for a signal from the controller. Consequently, wireless actuation of devices in such environments has been considered not worthwhile, too difficult or too risky.

A need therefore exists for a flexible user interface, whose input bandwidth can be readily scaled whilst not compromising critical factors such as number of digits required for operation, power consumption, physical size and the cognitive load associated with operation.

SUMMARY OF THE INVENTION

According to a first aspect of the invention, there is provided a human machine interface (HMI) system for controlling a device comprising: a housing; a human digit activatable physical element; a processor in communication with the element, the processor to receive and process an input from the element; a communicator to communicate an output from the processor wherein the output comprises a command intended for the device; wherein the element, the processor and the communicator are all disposed about or within the housing or connected thereto. In some preferred embodiments, the element, the processor and the communicator are all disposed about or within the housing. In some embodiments, the device is physically connected to the housing, in some embodiments the device is not.

In another aspect of the invention, there is provided a computer implemented method of controlling a device comprising: receiving an input originating from a human digit activatable element; processing the input to determine an output comprising a command for the device; and communicating the output to the device; wherein the processing step comprises: identifying one or more sub-inputs from the input; determining a separate value for each subinput; mathematically processing each sub-input to determine an output value; and identifying an output command from said output value. In some preferred embodiments, the separate value for each sub-input is determined from a table and in some preferred embodiments, the output command is determined from a table.

A method according to the invention may comprise mathematical processing for n sub-inputs according to the formula:

$$\text{Sub-input } 1 + \ldots + \text{sub-input } n = \text{output value}$$

In some embodiments the method of the invention comprises the steps of: processing a chronologically first sub-input to determine a subset of outputs; processing at least one chronologically subsequent sub-input to determine an output value. In some preferred embodiments, the chronologically subsequent sub-input comprises the absence of activation of a human digit activatable physical element over a predetermined time period. In some embodiments, the method of the invention may also comprise the steps of: recording a time of first sub-input; monitoring an elapsed time after the first sub-input until it reaches a predetermined elapsed time value; if no subsequent sub-input is received before the predetermined elapsed time value, processing the absence of subsequent input as a predetermined output value. The predetermined elapsed time value maybe of any suitable value—practicable for the purpose at hand. For example, in an implementation designed for quick responses (such as for military personnel) then a shorter time may be required, for example about 1 second or less, preferably half a second or less. Typically the predetermined output value according to this implementation will correspond to a default or a most commonly used setting for the controlled device, and typically it will be a setting that does not create danger for a user. For example, if a user makes a mistake or is distracted whilst adding subinputs so that the overall input is interrupted but corresponds to an input with a single first input, then the output corresponding to that input should be safe. For example, military personnel may elect not to set a torch to on through such an input function. Typically in such embodiments, the predetermined elapsed time value is less than about 2 seconds, optionally less than about 1.5 seconds, optionally less than about 1 second, optionally about 0.5 to 1 second, optionally about 0.5 seconds.

In some implementations of this embodiment of the invention, the first processing step determines a selection of electronic device to control and the second processing step determines a command for that device.

In another aspect of the invention, there is provided a human machine interface apparatus comprising a base and a protuberance extending therefrom, the protuberance being movable about an axis defined by the base and movable in directions defined by at least one guide to connect a plurality of control points within the guided path, the control points intended for correspondence with one or more control instructions for a controlled device.

In another aspect of the invention, there is provided a human machine interface apparatus comprising a base and one or more guides disposed about the periphery of the base so as to guide a human digit, the base comprising a conductive element to enable a human digit to cause an input by slidably engaging the surface of the base with a digit, the input being useable to send an instruction to a controlled device.

The invention also provides a human machine interface apparatus comprising a plurality of activatable elements disposed in close side by side contact with one another, such that on depression of a predefined one or more elements, an input is generated corresponding to an instruction for a controllable device.

In another aspect, the invention provides a human machine interface system comprising a human machine interface wirelessly connected to a device controller, the device controller comprising a wireless transceiver and a passive movement sensor physically connected to a processor wherein upon detection of movement, the device controller is switched into an active state. Some embodiments comprise a timer, wherein the device controller is automatically switched into an inactive state once a predetermined amount of time without movement has elapsed. Some embodiments comprise a timer, wherein the device controller is switched into an inactive state via a wireless command from the HMI controller once a predetermined amount of time without movement has elapsed.

In some embodiments of this aspect of the invention there is provided a system comprising a microcontroller wherein the movement sensor is electronically connected between the microcontroller's interrupt line and ground. Some embodiments comprises a mechanical movement sensor which optionally comprises one or more spherical conducting items able to roll within a housing and thereby open or close an electrical connection with movement.

In another aspect of the invention, there is provided a computer implemented method of reducing power consumption in a human machine interface system comprising a wireless device comprising: receiving data input from a chronological device; on receiving data consistent with a predetermined chronological period having elapsed, sending an instruction to a wireless chipset to reduce the active listening rate of the wireless device to a predetermined level; receiving data input from a movement sensing device consistent with an occurrence of movement; sending an instruction to a wireless chipset to increase the active listening rate to a predetermined level.

BRIEF DESCRIPTION OF THE DRAWINGS

FIG. 13 is a series of flow charts expressing how the bandwidth of a one button controller can be expanded according to the invention.

DETAILED DESCRIPTION

Figure 1:
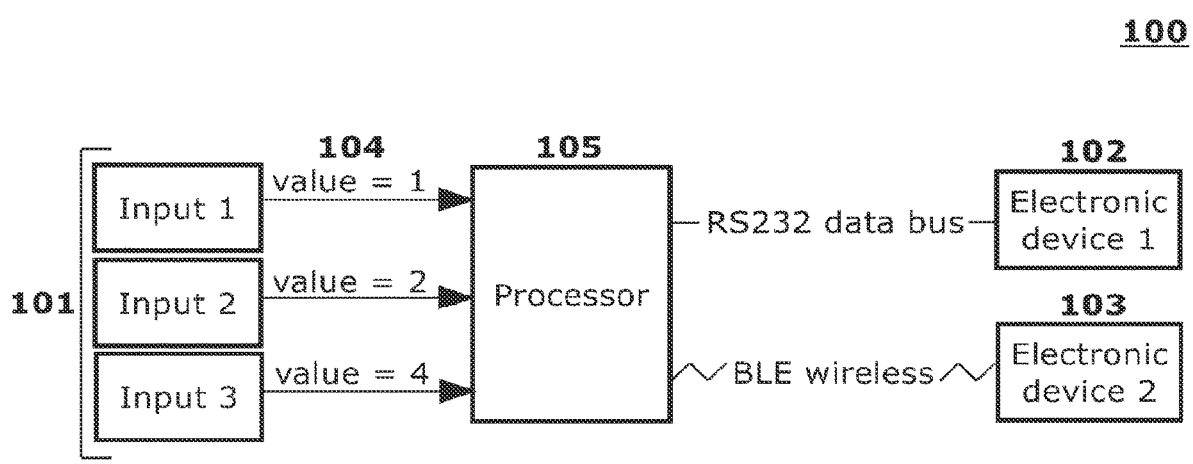
FIG. 1 is a schematic diagram of an example human machine interface according to the invention.

It is convenient to describe the invention herein in relation to particularly preferred embodiments. However, the invention is applicable to a wide range of situations and it is to be appreciated that other constructions and arrangements are also considered as falling within the scope of the invention. Various modifications, alterations, variations and or additions to the construction and arrangements described herein are also considered as falling within the ambit and scope of the present invention.

An interface according to the invention may be used in conjunction with any suitable control function of an electronic device which is desired to be operated from a simplified control device. For example, it may operate a flashlight, a radio, a tracking system, an emergency signal or beacon, sighting devices, a computer, an unmanned vehicle, a weapon, etc.

According to one aspect of the invention, there is provided an HMI for control of an electronic device, which optionally comprises one or more of a data bus controlled device, a device not connected by an electrical conductor. a switch load device or a computer, the interface's input being readily scalable from one lo many human digits.

According to one aspect of the invention, there is provided a human digit operable human machine interface (HMI) for control of an electronic device, the interface's input being readily scalable from one to many human digits.

The electronic device may optionally comprise any device for which a simplified operation is desirable. In some preferred embodiments, it comprises one or more of a data bus controlled device, a device not connected by an electrical conductor, a switch load device or a computer. Any suitable human digit may be used to operate a device according to the invention. In some embodiments, the term 'digit' as used herein may comprise any suitable human appendage, for example one or more of a finger, a thumb, a hand, an elbow, a toe, a foot, a knee. a head or a tongue.

Scalability of the input bandwidth of an interface according to the invention may be achieved in a variety of ways. An HMI according to the invention may comprise a processor which is configurable to execute a control function of one or more electronic devices based on the activation of one or more electrical switches or input regions (herein referred to as "inputs", "elements" or "activatable physical elements"). Various algorithmic or other operations may be applied by the processor to the input signals thus produced in order to arrive at a command which causes a control function. For example, some preferred embodiments comprise a plurality of inputs (such as multiple buttons or slidable input surfaces, or a Stick Control. or a Slide Control, or a Quad Pad, etc.) and user input to the HMI through each separate input is assigned a numeric value, and the combined numeric value of all inputs activated by the user (herein referred to as the "combined input value") is independently accumulated by the processer to generate the command.

In some embodiments, while there is provided only a limited number of inputs (for example three), the bandwidth of these limited inputs is expanded by processing the first activation of an input as a choice of which electronic device (or subset of electronic devices) to control, and the second input activation as a choice of which function to control on said device. An example process flow of such an embodiment is outlined in the bullet points below. This same process flow is described in FIG. 12, with flow charts 1201, 1202 and 1203 describing the logic flow for input sequences beginning with inputs 1, 2 and 3 respectively.

If input 1 is activated, then deactivated, control an illuminator function as specified:
  if input 1 is then activated, turn flashlight on until deactivated;
  if input 2 is then activated, strobe flashlight on/off until deactivated;
  if input 3 is then activated, turn laser on until deactivated.
If input 2 is activated, then deactivated, control a TWS function as specified:
  if input 1 is then activated, then deactivated, toggle thermal weapon sight on/off;
  if input 2 is then activated, then deactivated, toggle black hot/white hot polarity;
  if input 3 is then activated, then deactivated, toggle gain.
If input 3 is activated, then deactivated, control a hands-free radio function as specified:
  if input 1 is then activated, turn push-to-talk (PTT) on until deactivated;
  if input 2 is then activated, then deactivated, change volume;
  if input 3 is then activated, then deactivated, change channel.

This same process flow is described from the perspective of the controller's processor below.

The controller processor receives an input corresponding to user activation of input 1;
the controller processor receives an input corresponding to user deactivation of input 1;
  the controller processor receives an input corresponding to user (re)activation of input 1;
  the controller processor flips an output line controlling a switching component (such as a MOSFET or relay), thereby closing a physically connected flashlight power circuit and turning the flashlight on;
  the controller processor receives an input corresponding to user deactivation of input 1;
  the controller processor flips the output line controlling the switching component, thereby opening the flashlight power circuit and turning the flashlight off.
OR:
  the controller processor receives an input corresponding to user activation of input 2;
  the controller processor continuously flips the state of an output line controlling a switching component (such as a MOSFET or relay), thereby closing and opening a physically connected flashlight power circuit and strobing the flashlight on and off;
  the controller processor receives an input corresponding to user deactivation of input 2;
  if the flashlight power circuit is currently open, the controller processor does nothing;
  if the flashlight power circuit is currently closed, the controller processor flips the output line controlling the switching component, thereby opening the flashlight power circuit and turning the flashlight off.
OR:
  the controller processor receives an input corresponding to user activation of input 3;
  the controller processor flips an output line controlling a switching component (such as a MOSFET or relay), thereby closing a physically connected laser power circuit and turning the laser on;
  the controller processor receives an input corresponding to user deactivation of input 3;
  the controller processor flips the output line controlling the switching component, thereby opening the laser power circuit and turning the laser off.
OR:
The controller processor receives an input corresponding to user activation of input 2;
the controller processor receives an input corresponding to user deactivation of input 2;
  the controller processor receives an input corresponding to user activation of input 1;
  the controller processor receives an input corresponding to user deactivation of input 1;
  the controller processor reads the TWS "toggle on/off" command string stored in local non-volatile memory (NVRAM) and writes this command string to a data bus transceiver (for example RS232) which is physically connected to both the controller processor and the controlled TWS.
OR:
  the controller processor receives an input corresponding to user (re)activation of input 2;
  the controller processor receives an input corresponding to user deactivation of input 2;
  the controller processor reads the TWS "toggle polarity" command string stored in NVRAM and writes this command string to a data bus transceiver which is physically connected to both the controller processor and the controlled TWS.

OR:

the controller processor receives an input corresponding to user activation of input 3;

the roller processor receives an input corresponding to user deactivation of input 3;

the controller processor reads the TWS "toggle gain" command string stored in NVRAM and writes this command string to a data bus transceiver which is physically connected to both the controller processor and the controlled TWS.

OR:

The controller processor receives an input corresponding to user activation of input 3;

the controller processor receives an input corresponding to user deactivation of input 3;

the controller processor receives an input corresponding to user activation of input 1;

the controller processor pulls an output line physically connected to the handsfree radio's PTT line to electrical ground, thereby turning the radio's PTT function on;

the controller processor receives an input corresponding to user deactivation of input 1;

the controller processor pulls the output line physically connected to the handsfree radio's PTT line back to circuit supply voltage (Vee), thereby turning the radio's PTT function off;

OR:

the controller processor receives an input corresponding to user activation of input 2;

the controller processor receives an input corresponding to user deactivation of input 2;

the controller processor reads the hands-free radio "change volume" command string stored in NVRAM and writes this command string to a data bus transceiver which is physically connected to both the controller processor and the controlled hands-free radio.

OR:

the controller processor receives an input corresponding to user (re)activation of input 3;

the controller processor receives an input corresponding to user deactivation of input 3;

the controller processor reads the hands-free radio "change channel" command string stored in NVRAM and writes this command string to a data bus transceiver which is physically connected to both the controller processor and the controlled hands-free radio.

In some embodiments, there is provided only a single input, and the number and/or duration of activations of said input determines the command generated by the processor. As an example, encoding similar to Morse Code may be used, so that for example, a dot (short input) followed immediately by a dash (prolonged input) may turn on a flashlight, and a standalone dash may operate a PTT function on a hands-free radio. This process flow is outlined below. An example process flow of such an embodiment is outlined in the bullet points below. This same process flow is described in FIG. 13, with flow charts 1301 and 1302 describing the logic flow for input sequences beginning with a dot and a dash respectively.

If first input is dot:
    if dot follows within 500 ms, turn on flashlight;
    if dash follows within 500 ms, turn off flashlight;
    if 500 ms elapses with no further input, turn on laser.
If first input is dash:
    if dot follows within 500 ms, change radio volume;
    if dash follows within 500 ms, change radio channel;
    if 500 ms elapses with no further input, turn off laser.

This same process flow is described from the perspective of the controller's processor below.

Phase 1: processing inputs

The controller processor receives an input corresponding to user activation of input;

the controller processor begins timing ms of elapsed time using the signal from a physically connected crystal oscillator or ceramic resonator;

the controller processor receives an input corresponding to user deactivation of input;

the controller processor ceases timing and stores the elapsed time value in local memory in a variable named (for example) "first_input_elapsed_time";

the controller processor resets the elapsed time value to 0 and resumes timing ms of elapsed time;

the controller processor receives an input corresponding to user activation of input OR the (current) elapsed time value reaches 500 ms (whichever occurs first).

IF user activation of input occurred before the elapsed time value reached 500 ms:
    the controller processor ceases timing and stores the elapsed time value in local memory in a variable named (for example) "elapsed_time_between_inputs";
    the controller processor resets the elapsed time value to 0 and resumes timing ms of elapsed time;
    the controller processor receives an input corresponding to user deactivation of input;
    the controller processor ceases timing and stores the new elapsed time value in local memory in a variable named (for example) "second_input_elapsed_time";
    the controller processor resets the elapsed time value to 0.
ELSE, IF the elapsed_time_between_inputs reached 500 ms:
    the controller processor ceases timing and stores the elapsed time value of 500 ms in local memory in the "elapsed_time_between_inputs" variable;
    the controller processor resets the elapsed time value to 0.

Phase 2: processing outputs:

the controller processor compares the values of "first_input_elapsed_time", "elapsed_time_between_inputs" and "second_input_elapsed_time" to pre-determined values stored in local NVRAM (for this example 500 ms is used as the comparison value for all variables).

IF the value of "first_input_elapsed_time" is less than 500 ms:
    IF the value of "elapsed_time_between_inputs" is less than 500 ms:
        IF the value of "second_input_elapsed_time" is less than 500 ms, the controller processor flips an output line controlling a switching component (such as a MOSFET or relay), thereby closing a physically connected flashlight power circuit and turning the flashlight on.
        ELSE, IF the value of "second_input_elapsed_time" is greater than or equal to 500 ms, the controller processor flips an output line controlling a switching component (such as a MOSFET or relay), thereby opening the flashlight power circuit and turning the flashlight off.

ELSE, IF the value of "elapsed_time_between_inputs" is equal to 500 ms, the controller processor flips an output line controlling a switching component, thereby closing a physically connected laser power circuit and turning the laser on.

ELSE, IF the value of "first_input_elapsed_time" is greater than or equal to 500 ms:

IF the value of "elapsed_time_between_inputs" is less than 500 ms:

IF the value of "second_input_elapsed_time" is less than 500 ms, the controller processor reads the hands-free radio "change volume" command string stored in NVRAM and writes this command string to a data bus transceiver which is physically connected to both the controller processor and the controlled hands-free radio.

ELSE, IF the value of "second_input_elapsed_time" is greater than or equal to 500 ms, the controller processor reads the hands-free radio "change channel" command string stored in NVRAM and writes this command string to a data bus transceiver which is physically connected to both the controller processor and the controlled hands-free radio.

ELSE, IF the value of "elapsed_time_between_inputs" is equal to 500 ms, the controller processor flips an output line controlling a switching component, thereby opening a physically connected laser power circuit and turning the laser off.

More complicated algorithmic transformations of input data may be utilised for a variety of reasons, for example lo dramatically increase the number of devices operable from a simple interface according to the invention, to increase the security of operation, etc.

In addition to the processing of input signals, other aspects of the invention which may be modified to achieve scalability of the interface's input bandwidth include varying the number or configuration of the inputs provided. Where application specific restrictions do not prevent it, the interface may be scaled simply by varying the number of input~ for applications requiring control of more or less total functions, more or less total inputs can be provided respectively.

The processor used to process inputs and arrive at a command may be physically located in any suitable position. In some embodiments it is located near or within one or more input devices, in some embodiments it is located near or within one or more electronic devices to be controlled and in some embodiments it is located separately from inputs and electronic devices. Communication between inputs, the processor and electronic device(s) may be done in any suitable manner. In some embodiments, one or more cables may physically connect one or more pieces of hardware, with communication occurring via a data bus.

In some embodiments, communication is wireless, for example using Bluetooth or a proprietary radio frequency or magnetic induction link. The skilled addressee will appreciate that it is not necessary for a cable to be used with the current invention, and that its features of scalability and use do not rely on a cable. Wireless implementations of the invention have the advantage that they reduce the likelihood that cables will be entangled or snagged on external objects such as vegetation or buildings or furniture etc. Some wireless implementations are lighter as well.

Figure 7:
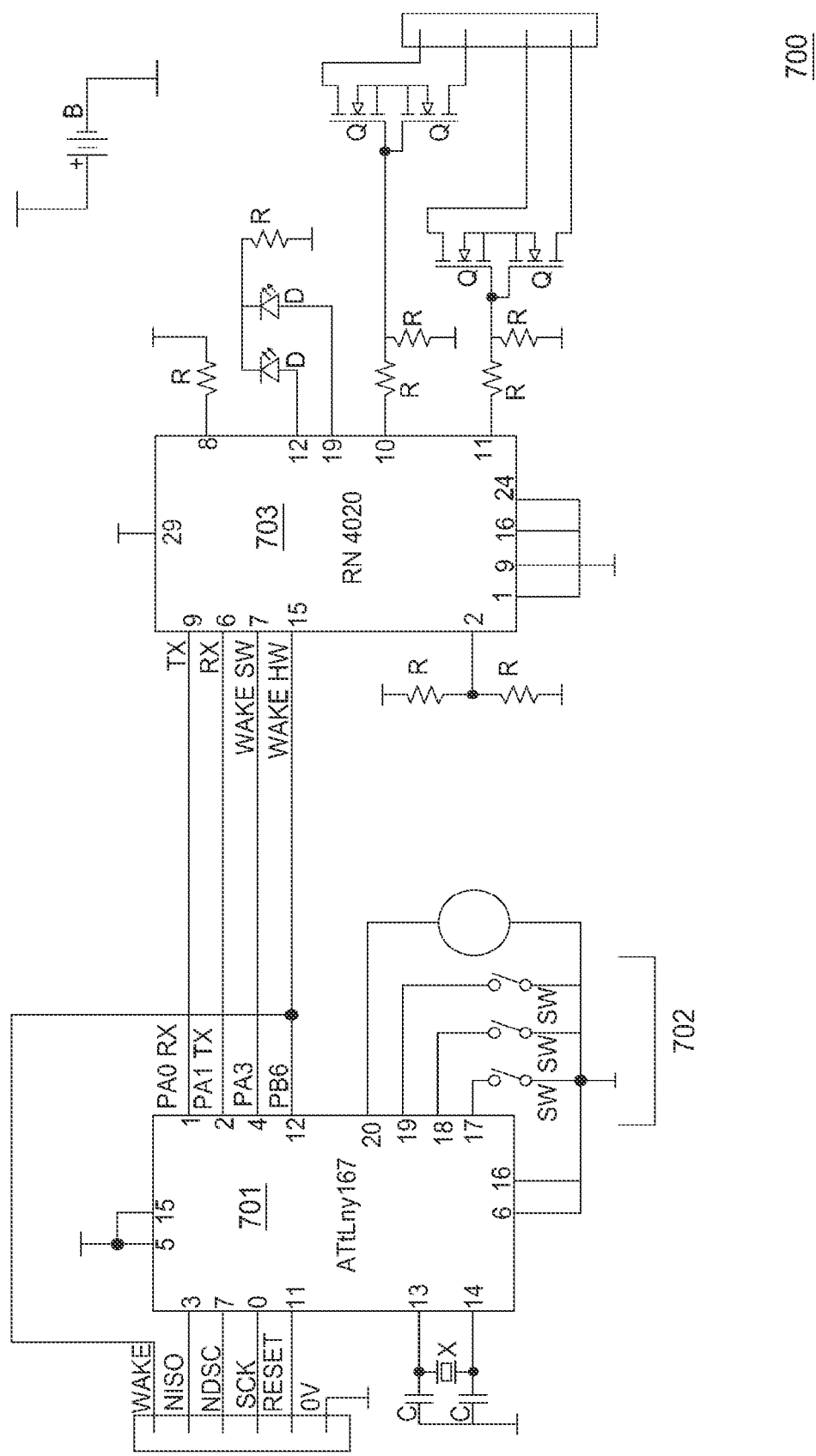
FIG. 7 is an example circuit wiring diagram for an example embodiment of a wireless controller according to the invention comprising three switches for inputs, a Bluetooth BLE wireless chipset and a microprocessor.
Figure 8:
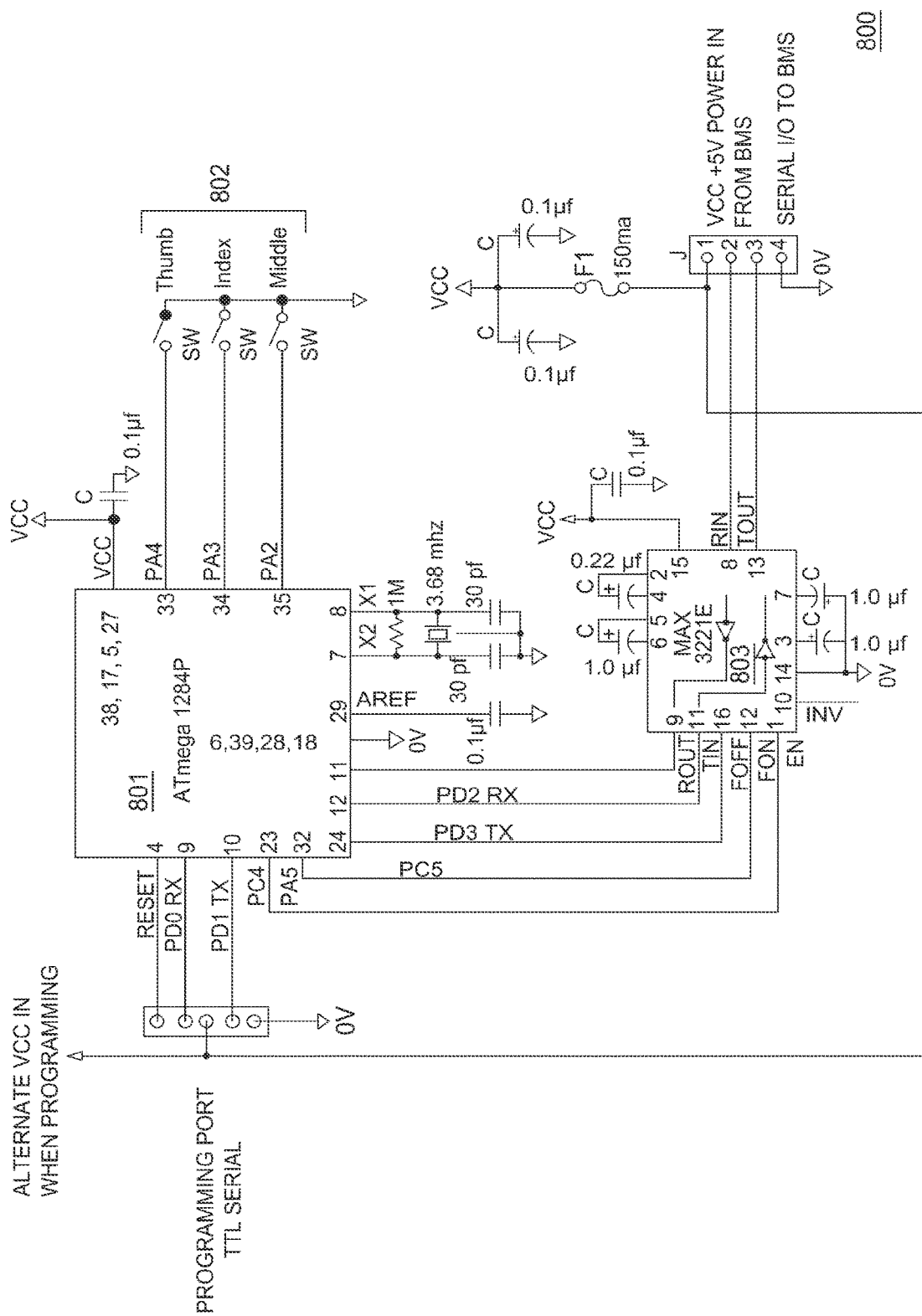
FIG. 8 is an example circuit wiring diagram for an example embodiment of a cabled controller according to the invention comprising three switches for inputs, an RS232 data bus transceiver and a microprocessor.

FIG. 7 is an example circuit diagram for an example embodiment of a controller according to the invention comprising 3 buttons for inputs, a Bluetooth BLE wireless chipset and a microprocessor. As a point of contrast, FIG. 8 is an example circuit diagram for an example embodiment of a cable—connected controller according to the invention comprising 3 buttons for inputs and a microprocessor.

Any suitable wireless protocol may be used for a wireless implementation of the present invention. Preferably the wireless protocol is designed for low energy consumption and low range. Examples of wireless protocols that might be used include:

Bluetooth—a global 2.4 GHz personal area network for short-range wireless communication.

BLE—a version of Bluetooth which consumes considerably less power than Classic Bluetooth but has a lower data transfer rate.

ZigBee—a 2.4 GHz mesh local area network (LAN) protocol.

Z-Wave—a sub-GHz mesh network protocol.

NFC (Near field communication)—network protocols used for very close communication.

RFID—in most systems, only one side of an RFIDlink possesses a native power supply. The powered side transmits an RF electromagnetic wave which induces an electric current in the receiving chip. The induced current in the receiver (which does not have a native power supply) is sufficient for it to generate a wireless command in response or to perform a low power operation.

SigFox—uses differential binary phase-shift keying (DBPSK) in one direction and Gaussian frequency shift keying (GFSK) in the other direction.

ANT or ANT+—similar to BLE—designed to create networks that piggyback off of existing hardware.

In some wireless embodiments, an apparatus of the invention further comprises a remotely located wireless transceiver, a processor and a physical connector to connect with a device to be controlled. In these embodiments, after input by a user (such as by pressing a button), the controller according to the invention sends a wireless signal which is received by the wireless transceiver, passed to the processor which accesses a data store, translates the data into a second signal which is passed through the connector to the controlled device and thereby causes the device to execute a command associated with the input into the controller. It will be appreciated that such an embodiment has particular utility in enabling current non-wireless devices to be retrofitted with the capability to be wirelessly controlled by a controller according to the invention. In some embodiments, the device to be controlled itself comprises a wireless transceiver and a processor so that it can receive, translate and execute commands.

In some preferred embodiments of the invention which are particularly useful in hostile or risky environments, native control of a device is maintained, so that if wireless or other functionality associated with the controller is disabled or not working correctly, the relevant device can still be operated by a user.

In typical wireless based systems one device acts as the "master" (also referred to as "central" or "access point")—from which a radio signal emanates—and which may receive data from the "slave" device (also known as the "peripheral" or "endpoint" (the device which is sensing data to be transmitted or which is to be controlled from the access point). In normal operation, an HMI or controller according to the invention will act as master and each of the devices to be controlled (such as lights, cameras, laser sights, etc.) act as slaves. Each controller and controlled device in a wireless system according to the invention provide some method of initialising wireless communication between the controller and the controlled device. This holds true regardless of whether the control is direct, or via a wireless transceiver physically connected to the controlled device. An example process flow of how a wirelessly controlled slave device is linked to a master controller is outlined in the steps below.

User activates an input or inserts a battery to put the slave device into pairing mode. Slave device then begins advertising its presence wirelessly, searching for a master controller to connect to. In its advertisement, the slave device will transmit information about what type of device it is, along with a unique device ID.

User activates an input, or series of inputs, or inserts a battery to put the master controller into pairing mode. Controller then begins scanning for a new slave device to connect to.

Master controller detects pairing advertisement from slave device and assesses whether the device is compatible. Only pre-defined slave device types can be connected to and controlled.

If slave device type is compatible, master controller stores the device type and unique device ID in NVRAM and transmits a message back to the slave device confirming that a wireless connection has been established. This message will include a unique device ID associated with the controller.

Slave device receives wireless connection confirmation message and stores the controller's unique device ID in NVRAM.

A wireless connection has now been established between the master controller and the slave device. Subsequent wireless commands issued from the controller will include both the controller's and the controlled device's unique IDs, such that the controlled slave device can verify that any wireless command it receives was issued from the controller that it is paired to.

This same process flow is described from the perspective of the controller's processor below.

The controller processor receives an input corresponding to user activation of an input or series of inputs to switch the controller into scan for new slave device mode.

The controller processor writes a command to the physically connected wireless transceiver, instructing it to scan for slave devices to connect to.

The controller processor writes a command to the physically connected wireless transceiver, instructing it to scan for slave devices to connect to.

The controller processor receives data from the wireless transceiver comprising a list of advertising slave device types which were detected, along with their unique IDs.

For each slave device type received, the controller processor parses a lookup table stored in local NVRAM to determine whether the device is compatible.

For each compatible device type found, the controller processor stores the device type with its unique ID in local NVRAM and writes a command packet to the wireless transceiver instructing it to connect to this slave device. The command packet also includes the controller's unique ID.

According to the present invention, it has been found to be preferable if the controller is also able to act as a slave during connection to another computer or processor for the purposes of modifying firmware configuration, as outlined in the steps below.

Phase 1: user-defined configuration transmitted from computing device to controller User enters desired controller configuration into a user interface on a computing device such as a smartphone or PC.

User selects user interface option for computing device to act as master and scan for slave controller to connect to.

User activates an input or series of inputs to switch the controller into slave mode.

Computing device establishes connection to controller (acting as slave) and transmits configuration data.

Controller stores configuration data in local NVRAM.

Phase 2: configuration data transmitted from controller to controlled devices.

Controller switches back into master mode and establishes connection to controlled slave device(s).

Controller transmits configuration data to controlled device(s).

Controller and controlled device(s) now behave according to new configuration.

This same process, with the controller temporarily switching its role to slave mode, is described from the perspective of the controller's processor below.

Phase 1: user-defined configuration transmitted from computing device to controller The controller processor receives an input corresponding to user activation of an input or series of inputs to switch the controller into slave mode.

The controller processor instructs the physically connected wireless transceiver to begin advertising its presence, searching for a master to connect to.

The controller processor receives a notification from the wireless transceiver that it has established a connection to a master computing device.

The controller processor receives user specific configuration data from the wireless transceiver (the wireless transceiver having previously received this configuration data via its wireless connection to the master computing device).

The controller processer writes this configuration data to local NVRAM.

Phase 2: configuration data transmitted from controller to controlled devices.

The controller processor switches back into master mode and instructs the physically connected wireless transceiver to re-establish connection to controlled slave device(s).

The controller processor receives a notification from the wireless transceiver that it has re-established connection to controlled slave device(s).

The controller processor reads the configuration data from local NVRAM, writes this data to the wireless transceiver and instructs it to transmit the data to the controlled slave device(s).

The controller and controlled device(s) now behave according to the new configuration.

In other embodiments, the controller maintains the role as master and the other computing device acts as slave, but thereafter transmits data to enable the firmware reconfiguration to occur at the controller end as outlined in the steps below.

Phase 1: user-defined configuration transmitted from computing device to controller.

User enters desired controller configuration into a user interface on a computing device such as a smartphone or PC.

User selects user interface option for computing device to appear as a slave device.

User activates an input or series of inputs to initiate controller scan for a slave computing device to connect to.

Controller establishes connection to computing device (acting as slave) which then transmits configuration data.

Controller stores configuration data in local NVRAM.

Phase 2: configuration data transmitted from controller to controlled devices.

Controller establishes connection to controlled slave device(s).

Controller transmits configuration data to controlled device(s).

Controller and controlled device(s) now behave according to new configuration.

This same process, with the controller maintaining its role as master, is described from the perspective of the controller's processor below.

Phase 1: user-defined configuration transmitted from computing device to controller.

The controller processor receives an input corresponding to user activation of an input or series of inputs to instruct the controller to scan for a slave computing device to connect to and receive configuration data from.

The controller processor instructs the physically connected wireless transceiver to begin scanning for advertisements from a slave computing device.

The controller processor receives a notification from the wireless transceiver that it has established a connection to a slave computing device.

The controller processor receives user specific configuration data from the wireless transceiver (the wireless transceiver having previously received this configuration data via its wireless connection to the slave computing device).

The controller processer writes this configuration data to local NVRAM.

Phase 2: configuration data transmitted from controller to controlled devices.

The controller processor instructs the physically connected wireless transceiver to reestablish connection to controlled slave device(s).

The controller processor receives a notification from the wireless transceiver that it has re-established connection to controlled slave device(s).

The controller processor reads the configuration data from local NVRAM, writes this data to the wireless transceiver and instructs it to transmit the data to the controlled slave device(s).

The controller and controlled device(s) now behave according to the new configuration.

Management of power and energy use can be critical for some implementations of the invention. For example, some implementations may require that the power source for the controller and or controlled devices are changed or recharged quite infrequently. For example, in those implementations which relate to a controller for use with a weapon, a soldier or police officer or the like will need to minimise time spent changing batteries and must be able to rely on the controller and controlled devices working as expected every time. Similarly those implementations that are in remote areas or situations where it is not possible to change the power source very often will require careful power management.

Wireless implementations of the invention have advantages as previously discussed, but can use more energy—for example in maintaining components in an active or 'listening' state whilst waiting for a command. In some implementations of the invention, the wireless protocol is chosen for energy efficiency. For example, BLE is a particularly preferred protocol due to the very low range and lower energy requirements.

Other protocols may also be used, for example RFID. In these implementations the controlled device requires no native power supply, relying on the signal received from the controller to energise it sufficiently to undertake its task. Such a task may for example be simply to identify itself, but other simple, low energy tasks may also be undertaken, for example to flip the state of a MOSFET to either close or open a flashlight power circuit.

Some embodiments of the invention utilise a passive movement sensor to detect movement and thereby switch a component from an inactive to an active state, for example when such a movement sensor is connected between a microcontroller's interrupt line and ground. Electronic movement sensors (such as accelerometers or gyroscopes etc) are less preferable for such a task as they themselves require energy to be able to sense movement.

Figure 10:
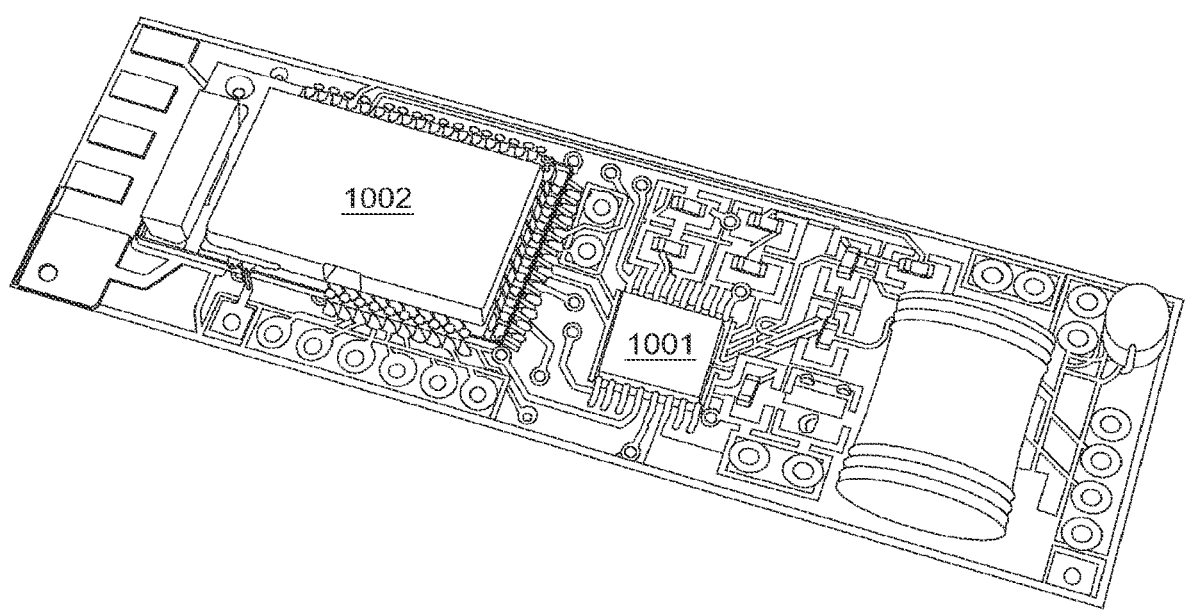
FIG. 10 depicts an example printed circuit board assembly (PCBA) for a controller according to the invention, comprising input switches, a microprocessor and a BLE wireless transceiver.

A simple mechanical movement sensor is preferred as the only thing required to be sensed is that movement has occurred, which signals that the device is now required to be ready for use. In some embodiments the mechanical movement sensor comprises one or more spherical conducting items that roll within a casing and thereby open or close an electrical connection with movement. FIG. 10 depicts an example circuit board for a controller according to the invention, comprising a microprocessor, a BLE chipset and such a mechanical sensor.

As an example, a soldier may have a gun with a controller according to the invention and a device such as a laser sight attached. If a controller and wireless connector according to this aspect of the invention is used with the laser sight, then the following steps may occur:

soldier at camp puts gun down while resting—a timer within a wireless connector (such as a Bluetooth BLE dongle with a BLE chipset) senses that a preset time has elapsed (e.g. 20 minutes) and switches active components to sleep mode to reduce energy consumption;

soldier picks up gun to resume active duties—a spherical conductor within the wireless connector's mechanical movement sensor moves, momentarily closing or opening the electrical connection between the microcontroller's interrupt line and ground;

the resulting interrupt wakes the wireless connector's microcontroller, which in turn wakes other active components, including the wireless transceiver which would be woken and instructed to resume listening for incoming commands from the controller.

Accordingly in some aspects of the invention, there is provided an algorithmic method of further reducing power consumption whilst effectively controlling a wireless device, optionally for use with a wireless connector according to the invention comprising: receiving data input from a chronological device; on receiving data consistent with a predetermined chronological period having elapsed, sending an instruction to a wireless chipset to reduce the active listening rate to a predetermined level; receiving data input from a movement sensing device consistent with an occurrence of movement; sending an instruction to a wireless chipset to increase the active listening to a predetermined level.

In some embodiments of this aspect of the invention, the listening device is turned off after a predetermined period of non-movement, and turned on again to full active listening once movement has occurred. In this embodiment reduction of the active listening rate would be to a predetermined level of zero.

In some embodiments the 'sleep' function is able to be turned off, either directly on the device or via a controller according to the invention. This may be particularly useful in certain embodiments, for example surveillance or stealth activities in which a user must remain immobile for a long period of time but must be ready to instantly act and use the relevant equipment.

An example of such an algorithmic method, which incorporates both the variable listening rate and the passive movement sensor, is outlined in the steps below. The term "latency period" herein refers to the elapsed time between an input or sequence of inputs being activated on the controller, and the controlled device executing the corresponding function.

System components booted and pairing established—wireless transceiver on the wireless connector begins actively listening for commands from the controller at the default rate of 10 Hz (latency period range 50-150 ms);

If 20 minutes elapses without receiving data input from the movement sensor, the wireless connector's microcontroller instructs the wireless transceiver to reduce its active listening rate to 2 Hz (latency period range 50-550 ms);

If a further 20 minutes elapses without receiving data input from the movement sensor, the wireless connector's microcontroller instructs the wireless transceiver to go to sleep (active listening rate 0 Hz);

At any point in time, when data input is received by the wireless connector's microcontroller from the movement sensor, the elapsed time counter is reset to 0 and the wireless transceiver is instructed to resume listening for commands from the controller at the default rate of 10 Hz.

Whilst some devices have an active and sleep mode, they are not as effective as the above described method since during sleep mode latency periods are much longer. Thus, the device being controlled (the laser sight in the above example), will not sense the instruction to 'wake up' for a longer period of time and therefore take longer to resume active listening which may endanger the user or cause other deleterious consequences associated with the delay.

In some embodiments of this aspect of the invention, there is a separate movement sensor within the controller which is wirelessly linked to the controlled device as well as in the wireless listening device. In some embodiments, the device being controlled itself comprises a wireless chipset and also a movement sensor.

In some embodiments the device may also be 'woken up' (i.e. switched to a higher advertising or listening rate) by simply activating a preset button or input on a controller according to the invention. In some embodiments it may be that the first such activation of an input will wake up all devices ready for action.

In some embodiments there is also provided a means to switch the device into sleep mode (or off) (again manually or via the controller) in such a way that it will still wake immediately upon movement.

A particularly useful aspect of such power management aspects of the invention is that it manages power for the user and substantially reduces the probability of human error.

In another example implementation, a user may have a single button version of a controller according to the invention which is used as a PTT button which is for example wirelessly connected to a UHF radio. In this embodiment, the controller itself will switch off when not in use, but once the button is activated, it will wake up, send the relevant signal to the associated radio and then switch off again, pending another button press.

In some embodiments, latency is a larger concern than power consumption, so that there may be no sleep function, or a minimal or scaled down version may be used.

However even when considering a fixed number of inputs, the number of functions controllable by suitably simple input combinations can be altered through modifying the configuration of the inputs. For example, consider an HMI according to the invention which provides five inputs. For an application where minimising cognitive load was most critical, each of the five digits of a human hand may be assigned to a single input. By having a dedicated input for example under each digit on the hand, the user's cognitive load would be minimised and ease of use maximised. Alternatively, for an application where only a single digit such as a finger was available for operation and a very limited mounting area presented, an HMI according to the invention may comprise a single thumb-controlled actuator which activated the five inputs via being moved up, down, left, right and being pushed in whilst in the centre position (as with the Stick Input of FIG. 2).

Typically for any given application of the invention, the number and type of inputs will be set so as to ensure that users rapidly become familiar with them and the user input required for each device command. By doing this, the user's need to learn new input methods to control matching device command types on newly added electronic devices becomes trivial. In particularly preferred implementations, even across differing implementations the same inputs are reserved for each type of electronic device command. So for example, 'turn GPS 011 and track me' is always done (for example) by pressing inputs—1 and 2. Therefore, if the operative's organisation decides to replace all GPS units with an upgraded, more complicated model, operatives will not have to learn a new-interface so as to operate the new GPS unit, but instead continue to use the current interface provided by the invention. The physical interface requires no change, and modifying the output control signal for 'turn GPS on and track me' is achieved via reconfiguration of the controller's firmware. This is a much more efficient method of deploying new equipment than re-training all operatives and allows for much more frequent, cutting edge equipment deployments. !n some embodiments, a controller according to the invention comprises NVRAM which can have a new output command string, eg for "turn GPS on and track me" written over where the old command was stored, The same firmware running on the same controller will access the same NVRAM storage location for the output command, but the new output command will now be accessed and sent.

The present invention discloses an HMI for control of an electronic device. FIG. 1 is a schematic diagram of such an HMI 100 in accordance with an embodiment of the disclosed invention. This HMI provides the user a plurality of inputs 101 arranged in such a manner as to afford a user the ability to control an electronic device with one or more digits. In this particular example two electronic devices are controlled, device 1 via an RS232 data bus 102 and device 2 via a Bluetooth Low Energy wireless connection 103.

Each input to the HMI is assigned a unique numeric value 104, and the combined numeric value of all inputs activated by the user at any given point in time (the combined input value) is independently accumulated by processer 105. The numeric values of inputs are assigned such that each unique combination of activated inputs will result in a unique combined input value being calculated by the processor. For example, in this particular HMI 100, when input 1 and input 3 are both activated, the processor 105 accumulates the associated values listed at 104 to calculate a combined input value of 1+4=5.

The value associated with each input is somewhat arbitrary, so long as the value of any input or combination of inputs cannot be replicated via activation of a different input or combination of inputs. Hence representing each input with the value of a unique bit in the binary numeral system (e.g. 1, 2, 4, 8, etc.) is a most suitable method of accumulating combined input values. However, this is not the only method of accumulating combined input values. Non-numeric values (or other unique numeric values) could also be implemented. For example, referring to the HMI 100, input 1 could be assigned a value of "a", input 2 assigned "b" and input 3 assigned "c". With these input values, when inputs 1 and 3 are both activated, the processor 105 would accumulate a combined input value of "a+c".

Said processor accumulation has a commencement and a cessation point. The commencement point is signalled by the first activation of any input, while the cessation point is signalled by the last deactivation of any input activated at or since the commencement point. At any given point in time, the combined input value represents the totality of activated inputs. Combined input values generated between the commencement and cessation points are called momentary combined input values, while the highest combined input value reached at any time between these two points is called the cessation maximum input value. The combined input value when no switches are activated will typically be assigned a value of 0.

Upon any change of input state, the combined input value is compared to a lookup table of values that represent defined operations, and if a match is found the corresponding outcome (control of an electronic device) is executed. In some instances, a specific sequence of combined input values may be required before a corresponding outcome is executed. To enable this, a list of previous combined input values (particularly previous cessation maximum input values) may be maintained by the processor.

Example Lookup Table for HMI 100

| Required combined input value(s) | Corresponding sequence of input activations | Resulting outcome |
| --- | --- | --- |
| 1 | Input 1 activated | Turn flashlight on |
| 1, 0 | Input 1 activated, input 1 deactivated | Turn flashlight off |
| 6, 0 | Inputs 2 and 3 activated, inputs 2 and 3 deactivated | Change radio volume |
| 2, 0, 4, 0 | Input 2 activated, input 2 deactivated, input 3 activated, input 3 deactivated | Change radio channel |

The process flow listing the steps required to arrive at each of these "resulting outcomes" is detailed below.

Turn flashlight on/off:
user activates input 1;
input state change generates a microcontroller hardware interrupt, waking it from sleep mode;
microcontroller calculates a combined input value of 1 (+1 from input 1 activated, +0 from input 2 not activated, +0 from input 3 not activated);
microcontroller parses a lookup table stored in local memory and finds an entry for "combined input value=1";
microcontroller executes the corresponding outcome "turn flashlight on";
microcontroller updates the stored value of current cessation maximum input value to 1 and returns to sleep mode;
user deactivates input 1;
input state change generates a microcontroller hardware interrupt, waking it from sleep mode;
microcontroller calculates a combined input value of O (no inputs activated);
microcontroller parses the stored lookup table and finds an entry for "combined input value=1, combined input value=O";
microcontroller executes the corresponding outcome "turn flashlight off";
microcontroller updates previous cessation maximum input value to 1 and resets current cessation maximum input value to O and returns to sleep mode.

Change radio volume:
user activates input 2 and input 3;
input state change generates a microcontroller hardware interrupt, waking it from sleep mode;
microcontroller calculates a combined input value of 6 (+O from input 1 not activated, +2 from input 2 activated, +4 from input 3 activated);
microcontroller parses a lookup table stored in local memory and finds no entry for "combined input value=6";
microcontroller updates the stored value of current cessation maximum input value to 6 and returns to sleep mode;
user deactivates input 2 and input 3;
input state change generates a microcontroller hardware interrupt, waking it from sleep mode;
microcontroller calculates a combined input value of O (no inputs activated);
microcontroller parses the stored lookup table and finds an entry for "combined input value=6, combined input value=O";
microcontroller executes the corresponding outcome "change radio volume";
microcontroller updates previous cessation maximum input value to 6 and resets current cessation maximum input value to O and returns to sleep mode.

Change radio channel:
user activates input 2;
input state change generates a microcontroller hardware interrupt, waking it from sleep mode;
microcontroller calculates a combined input value of 2 (+O from input 1 not activated, +2 from input 2 activated, +O from input 3 not activated);
microcontroller parses a lookup table stored in local memory and finds no entry for "combined input value=2";

microcontroller updates the stored value of current cessation maximum input value to 2 and returns to sleep mode;
user deactivates input 2;
input state change generates a microcontroller hardware interrupt, waking it from sleep mode;
microcontroller calculates a combined input value of O (no inputs activated);
microcontroller parses the stored lookup table and finds an entry for "combined input value=2, combined input value=O"
microcontroller updates previous cessation maximum input value to 2 and resets current cessation maximum input value to O and returns to sleep mode;
user activates input 3;
input state change generates a microcontroller hardware interrupt, waking it from sleep mode;
microcontroller calculates a combined input value of 4 (+O from input 1 not activated, +O from input 2 not activated, +4 from input 3 activated);
microcontroller parses a lookup table stored in local memory and finds no entry for "combined input value=2, combined input value=0, combined input value=4";
microcontroller updates the stored value of current cessation maximum input value to 4 and returns to sleep mode;
user deactivates input 3;
input state change generates a microcontroller hardware interrupt, waking it from sleep mode;
microcontroller calculates a combined input value of O (no inputs activated);
microcontroller parses the stored lookup table and finds an entry for "combined input value=2, combined input value=0, combined input value=4, combined input value=O";
microcontroller executes the corresponding outcome "change radio channel";
microcontroller updates previous cessation maximum input value to 4 and resets current cessation maximum input value to O and returns to sleep mode.

This same process flow is described from the perspective of the controller's processor below.

Turn flashlight on/off:
the controller processor receives an input corresponding to user activation of input 1;
the controller processor runs the accumulation algorithm to calculate a combined input value of 1;
the controller processor reads local memory to find the outcome corresponding to "combined input value=1" (turn flashlight on);
the controller processor flips an output line controlling a switching component, thereby closing a physically connected flashlight power circuit and turning the flashlight on;
the controller processor updates the value of the variable current_cessation_maximum_input_value to 1;
the controller processor receives an input corresponding to user deactivation of input 1;
the controller processor runs the accumulation algorithm to calculate a combined input value of O;
the controller processor reads local memory to find the outcome corresponding to "combined input value=1, combined input value=0" (turn flash light off);
the controller processor flips an output line controlling a switching component, thereby opening a physically connected flashlight power circuit and turning the flashlight off;
the controller processor updates the value of the variable previous_cessation_maximum_input_value to 1 and resets the value of the variable current_cessation_maximum_input_value to 0.

Change radio volume:
the controller processor receives an input corresponding to user activation of inputs 2 and 3;
the controller processor runs the accumulation algorithm to calculate a combined input value of 6;
the controller processor reads local memory to find the outcome corresponding to "combined input value=6" (no outcome);
the controller processor updates the value of the variable current_cessation_maximum_input_value to 6;
the controller processor receives an input corresponding to user deactivation of inputs 2 and 3;
the controller processor runs the accumulation algorithm to calculate a combined input value of O;
the controller processor reads local memory to find the outcome corresponding to "combined input value=6, combined input value=O" (change radio volume);
the controller processor reads the hands-free radio "change volume" command string stored in NVRAM and writes this command string to a data bus transceiver which is physically connected to both the controller processor and the controlled hands-free radio;
the controller processor updates the value of the variable previous_cessation_maximum_input_value to 6 and resets the value of the variable current_cessation_maximum_input_value to 0.

Change radio channel:
the controller processor receives an input corresponding to user activation of input 2;
the controller processor runs the accumulation algorithm to calculate a combined input value of 2;
the controller processor reads local memory to find the outcome corresponding to "combined input value=2" (no outcome);
the controller processor updates the value of the variable current_cessation_maximum_input_value to 2;
the controller processor receives an input corresponding to user deactivation of input 2;
the controller processor runs the accumulation algorithm to calculate a combined input value of 0;
the controller processor reads local memory to find the outcome corresponding to "combined input value=2, combined input value=0" (no outcome);
the controller processor updates the value of the variable previous_cessation_maximum_input_value to 2 and resets the value of the variable current cessation maximum input value to 0.
the controller processor receives an input corresponding to user activation of input 3;
the controller processor runs the accumulation algorithm to calculate a combined input value of 4;
the controller processor reads local memory to find the outcome corresponding to "combined input value=2, combined input value=0, combined input value=4" (no outcome);
the controller processor updates the value of the variable current_cessation_maximum_input_value to 4;
the controller processor receives an input corresponding to user deactivation of input 3;

the controller processor runs the accumulation algorithm to calculate a combined input value of 0;

the controller processor reads local memory to find the outcome corresponding to "combined input value=2, combined input value=0, combined input value=4, combined input value=0" (change radio channel);

the controller processor reads the hands-free radio "change channel" command string stored in NVRAM and writes this command string to a data bus transceiver which is physically connected to both the controller processor and the controlled hands-free radio;

the controller processor updates the value of the variable previous_cessation_maximum_input_value to 4 and resets the value of the variable current_cessation_maximum_input_value to 0.

Different embodiments of the present invention are optimised for differing human input ranging from a single digit, for example a thumb, through to many digits, for example the four fingers and thumb of a human hand—or multiple human hands. Which embodiment is best utilised for a given application is determined by matching the size of the total set of functions which require control to not only a suitable number of inputs, but also a suitable total number of input digits. Each of these will vary according to the intended application. Although it is possible for five inputs to be controlled with a single human digit, ease of use and simplicity of operation is maximised when those same five inputs (when suitably arranged) are controlled by a matching five human digits. A single digit can operate a single input (such as a button) far more easily than it can operate multiple different inputs.

Figure 2:
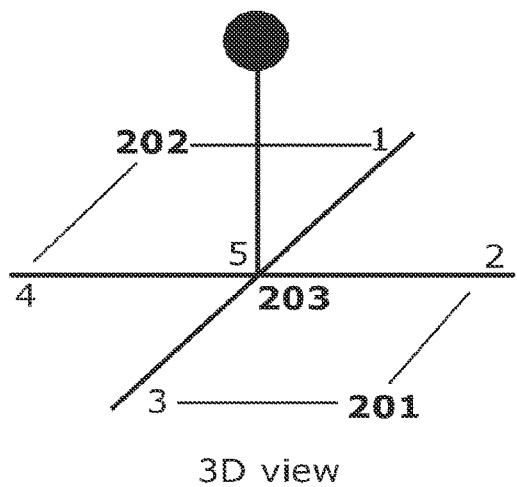
FIG. 2 is a schematic diagram of an example interface according to the invention, herein referred to as the Stick Control.
Figure 2:
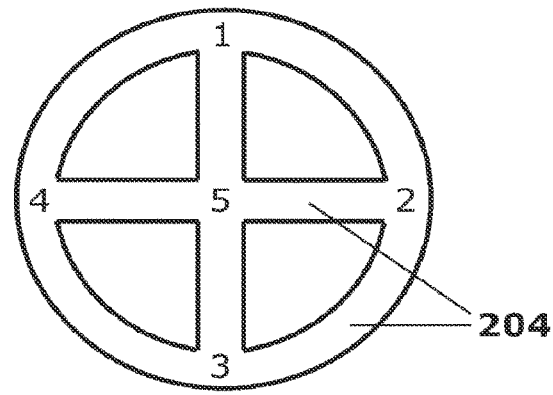

One preferred embodiment of the present invention is a Stick Control, which is optimised for control with a single digit. FIG. 2 is a schematic diagram of an example Stick Control 200. Nominally the Stick Control appears identical to a conventional joystick, however the movements of a Stick Control according to the invention are not related to any external directional input as is typically the case for joysticks. Stick Control inputs are arranged and numbered as shown in FIG. 2, with each marked value representing an input which can be activated by the user.

Accordingly in some preferred embodiments there is provided a human machine interface apparatus comprising a base and a protuberance extending therefrom, the protuberance being movable about an axis defined by the base and movable in directions defined by at least one guide to connect a plurality of control points within the guided path, the control points intended for correspondence with one or more control instructions for a controlled device. In some preferred embodiments, the protuberance is depressible to enable activation of a control instruction by depression. The protuberance may be of any suitable type able to be manipulated by a human digit. In some preferred embodiments it is optionally a stick, or elongated button, or generally joy-stick shaped.

By moving the Stick Control on the orthogonal axes, the user can activate any one of the four outer inputs 201, 202. An additional input is provided in the centre at the base of the actuator 203, and is activated by pressing down. This additional centre input may in some embodiments be utilised by the user to notify the processor of the aforementioned accumulation commencement and cessation points. In the simple example in which the processor sums the input values, any of the four outer inputs that are activated in between the commencement and cessation points will have their assigned numeric value accumulated by the processor, and will hence contribute to the resulting combined input value calculated.

A guide 204 may be used on the underside of a Stick Control to constrain and facilitate ready movements between inputs. The guide may comprise guide channels to limit the movement of the actuator to a set of predetermined paths. By moving the actuator to desired inputs, the user can indicate which input(s) they wish to activate.

Figure 3:
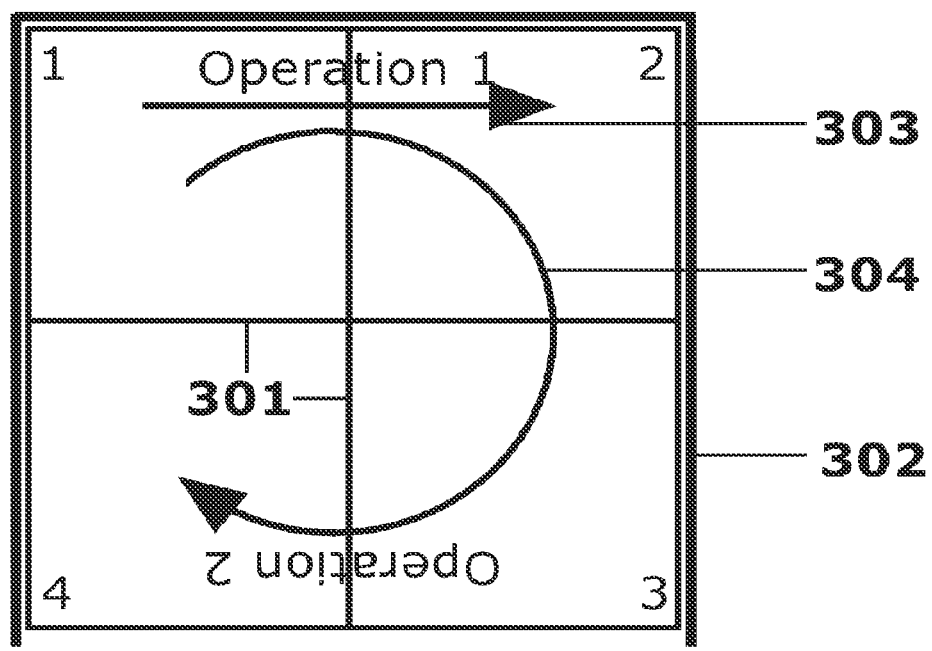
FIG. 3 is a schematic diagram of an example interface according to the invention, herein referred to as the Slide Control.

Another preferred embodiment of the present invention is a Slide Control, which provides touch activated inputs and is also optimised for control with a single digit. FIG. 3 is a schematic diagram of the Slide Control 300. Slide Control inputs are delineated 301 and are arranged and numbered as shown, with the region under each marked value representing an input which can be activated by the user. The Slide Control provides a three-sided wall, as shown by the thickened line 302, to enable the user to easily orient their digit such as a finger or thumb on the HMI's surface.

Accordingly in some preferred embodiments there is provided a human machine interface apparatus comprising a base and one or more guides disposed about the periphery of the base so as to guide a human digit, the base comprising a conductive element to enable a human digit to cause an input by slidably engaging the surface of the base with a digit, the input being useable to send an instruction to a controlled device. In some preferred embodiments, the guide (s) substantially surround the base such that a human digit is guided to remain in contact with the base during operation. In some preferred embodiments, one or more regions of the base are marked so as to enable a user to identify one or more control instructions corresponding to an input action associated with such regions. Such marking may be by any suitable means, for example grooves, symbols, embossing, etc.

The Slide Control also provides a smooth surface that readily enables the user to slide their digit over it. To activate multiple inputs for execution of a single operation, the user must place their digit on one of the desired inputs then slide to the other input(s) required to complete the desired operation. When multiple inputs are activated, the assigned numeric value of each activated input is accumulated by the processor, and contributes to the resulting combined input value calculated.

The sliding motion required to execute any given operation can also be labelled on the surface of the inputs as an instructional tool. For example, in order to complete "Operation 1" the user must touch their digit on input 1 then slide to input 2 before releasing 303, while to complete "Operation 2" the user must touch input 1 then slide over inputs 2 and 3 before releasing on input 4 304. Note that the position and direction of both the text and the arrows give the user all the information they need to complete any and all labelled operations.

Figure 4A:
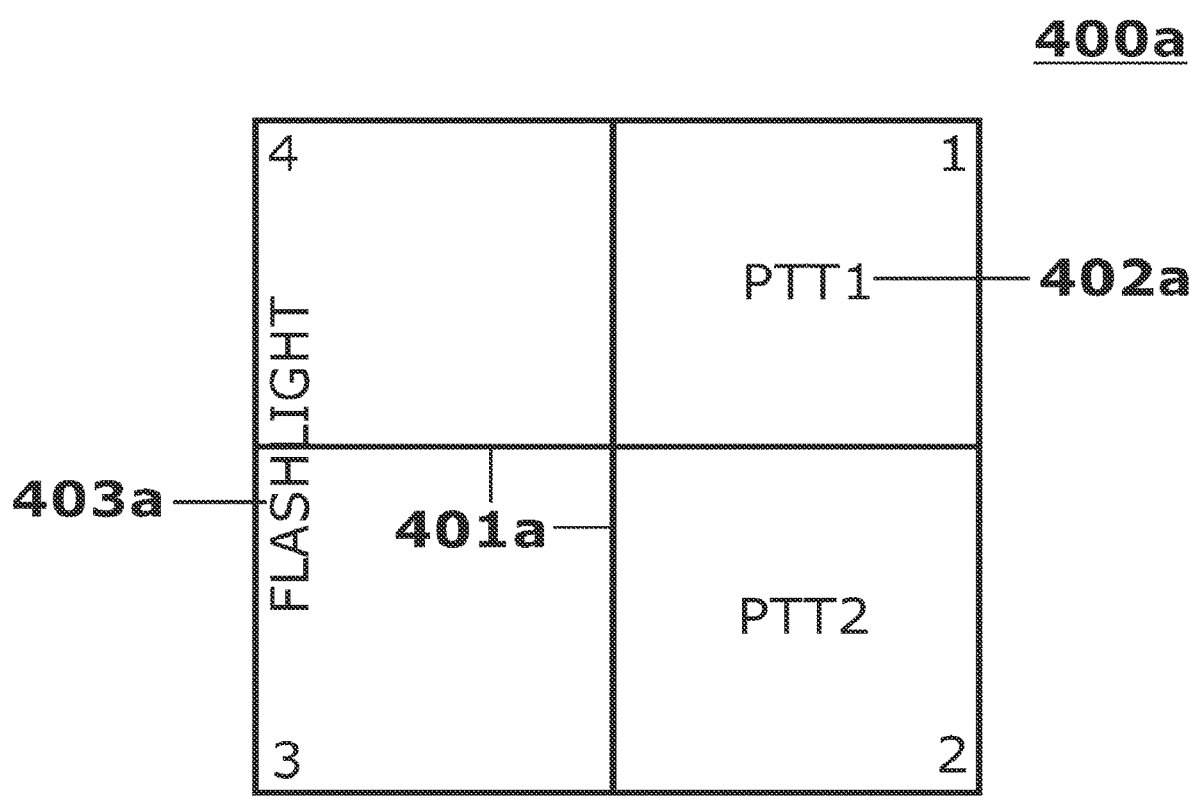
FIGS. 4a and 4b are schematic diagrams of an example interface according to the invention, herein referred to as the Quad Pad.
Figure 4B:
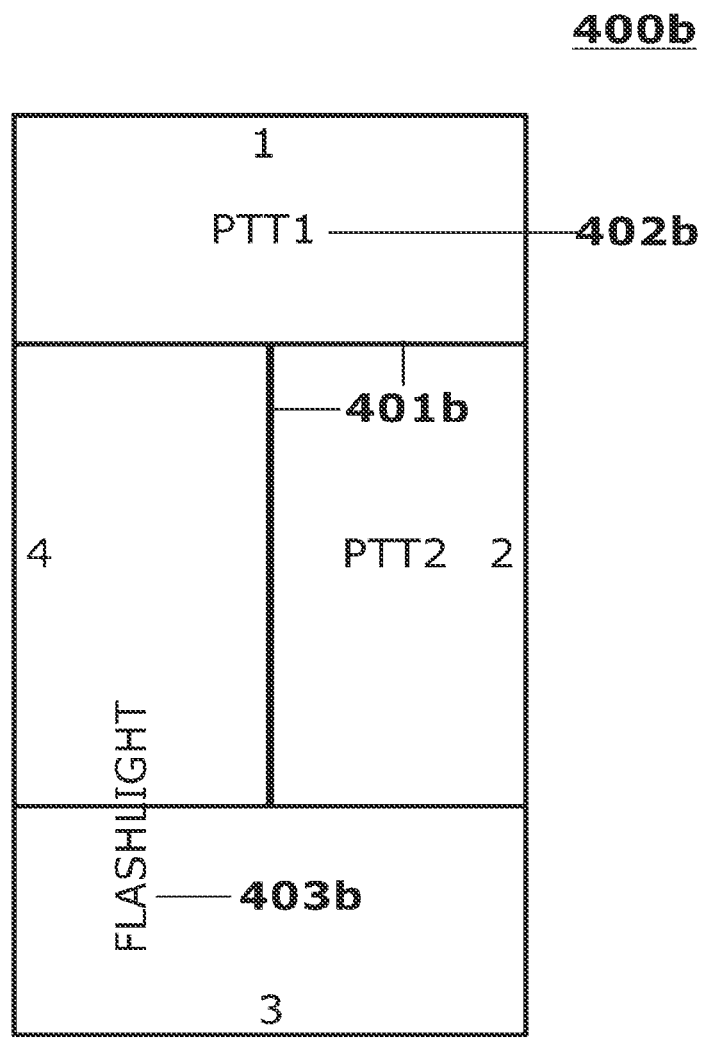

Another preferred embodiment of the present invention is the Quad Pad, which is optimised for use with one or two digits. FIGS. 4a and 4b are schematic diagrams of the Quad Pad 400a and 400b. As with the Slide Control, Quad Pad inputs are delineated 401a and 401b and are arranged and numbered as shown, with the region under each marked value representing an input which can be activated by the user. However, rather than using a touch sensitive surface on which the user slides over the inputs they wish to accumulate, the Quad Pad instead utilizes electrical switches arranged such that any combination of the four switches can be pressed simultaneously with either one or two digits. All inputs which are pressed simultaneously are accumulated by the processor and contribute to the resulting combined input value calculated.

Accordingly in some preferred embodiments there is provided a human machine interface apparatus comprising four depressible elements disposed in close side by side contact with one another, such that on depression of a predefined one or more elements, an input is generated corresponding to an instruction for a controllable device. The elements may be disposed in a plurality of ways, FIGS. 4a and 4b depict two examples. The embodiment depicted in FIG. 4b has been found to be advantageous as it allows combinations of 1, 2 or 3 buttons to be depressed by a single human digit. The Quad Pad may also utilise labelling on the surface of the inputs as an instructional tool. For example, the input 1 instruction of "PTT1" 402a and 402b show that the user must press input 1 (only) to activate the operation PTT1 (push-to-talk 1). The instruction "FLASHLIGHT" 403a and 403b, which is spread over inputs 3 and 4, shows that the user must press inputs 3 and 4 simultaneously to activate the operation "FLASHLIGHT".

Another preferred embodiment of the present invention is referred to herein as an E5 device. The number of digits that an E5 is optimised for depends on which set of inputs is being used. The processor and core electronics are located in the Control Box (CB), while the inputs are provided by way of an Input Switch Assembly (ISA). The CB and the ISA are physically connected via a cable. Having the input switch assembly located remotely provides the user a high level of flexibility regarding how many inputs they desire, how many digits they wish to utilise for activating said inputs, and where said inputs are located.

Figure 5:
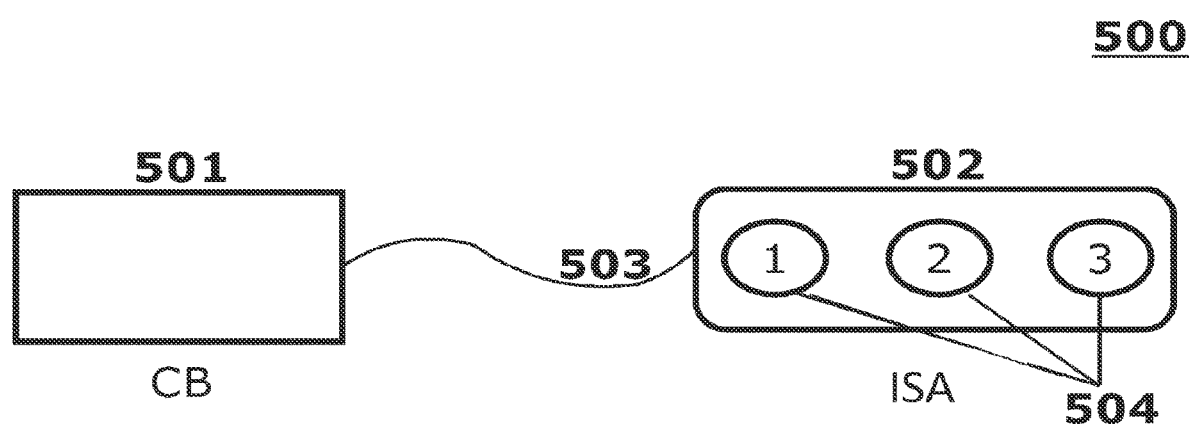
FIG. 5 is a schematic diagram of an example interface according to the invention, herein referred to as an E5 device.

FIG. 5 is a schematic diagram of an E5 500 with one particular embodiment of an ISA configuration shown. In this case the ISA is optimised for use with three digits. In this embodiment, the CB 501 is connected to the ISA 502 by a cable 503. As this particular embodiment of an ISA is optimised for three digits, it provides three inputs 504. All E5 inputs which are pressed simultaneously are accumulated by the processor and contribute to the resulting combined input value calculated.

Another preferred embodiment of the present invention is referred to herein as an E6 device. An E6 is designed to be mounted on the front of a weapon such that a user has five easily accessible inputs, one for each digit of their hand. The increased number of inputs provided by this embodiment enable a higher total number of functions to be easily controlled.

Figure 6:
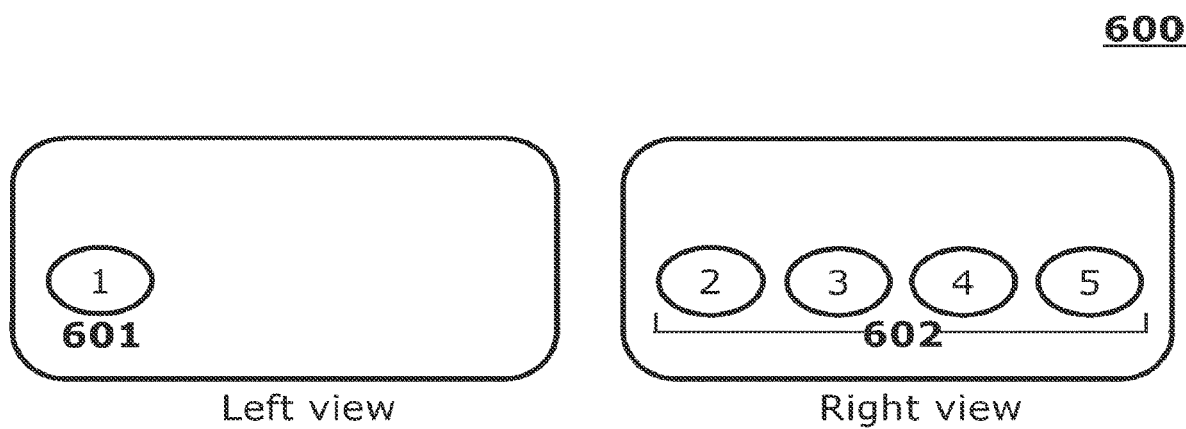
FIG. 6 is a schematic diagram showing the left and right view of an example embodiment related to weapon input control, herein referred to as an E6 device.

FIG. 6 is a schematic diagram showing the left and right view of an example implementation of an E6. It is for use with the left hand, with the thumb operating input 1 601, and the index, middle, ring and little fingers operating inputs 2, 3, 4 and 5 respectively 602. With five digits controlling just one input each, this embodiment provides a higher number of suitably simple input combinations than any of the previously listed embodiments of the present invention. As with the other embodiments disclosed, all inputs which are pressed simultaneously are accumulated by the processor and contribute to the resulting combined input value calculated.

FIG. 7 is a wiring diagram 700 of an example wireless three button controller according to the invention. Key components are the microprocessor 701, the input switches 702 and the wireless transceiver 703.

FIG. 8 is a wiring diagram 800 of an example wired three button controller according to the invention. Key components are the microprocessor 801, the input switches 802 and the data bus transceiver 803.

Figure 9:
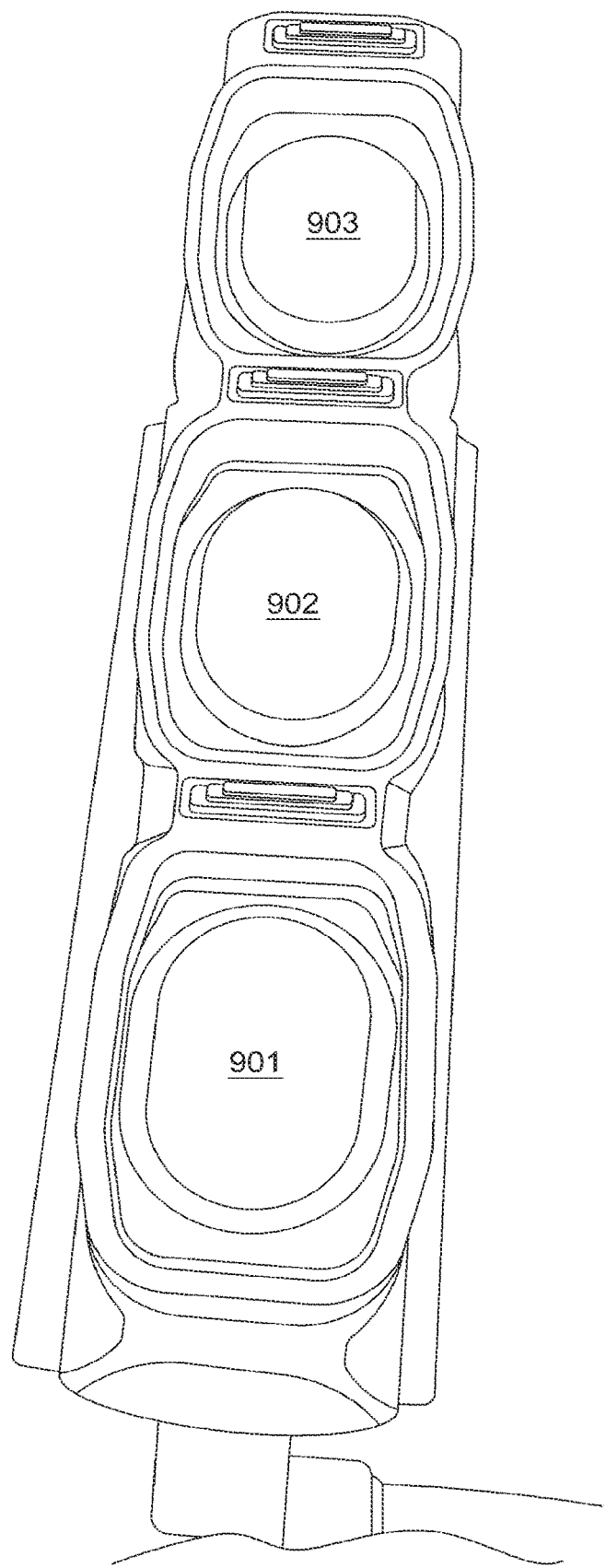
FIG. 9 is a top view of an example three button controller according to the invention.

FIG. 9 is a top view of an example three button controller housing 900 according to the invention. This housing is suitable to house either one of the circuits described in FIG. 7 or 8. Input switches 1, 2 and 3 are activated via pressing the buttons 901, 902 and 903 respectively.

FIG. 10 depicts a printed circuit board assembly (PCBA) 1000 of the example wireless three button controller wiring diagram 700. The microprocessor 1001 is physically connected to the wireless transceiver 1002 as shown in FIG. 7. The input switches are not visible in 700 as they are located on the other side of the PCBA.

Figure 11A:
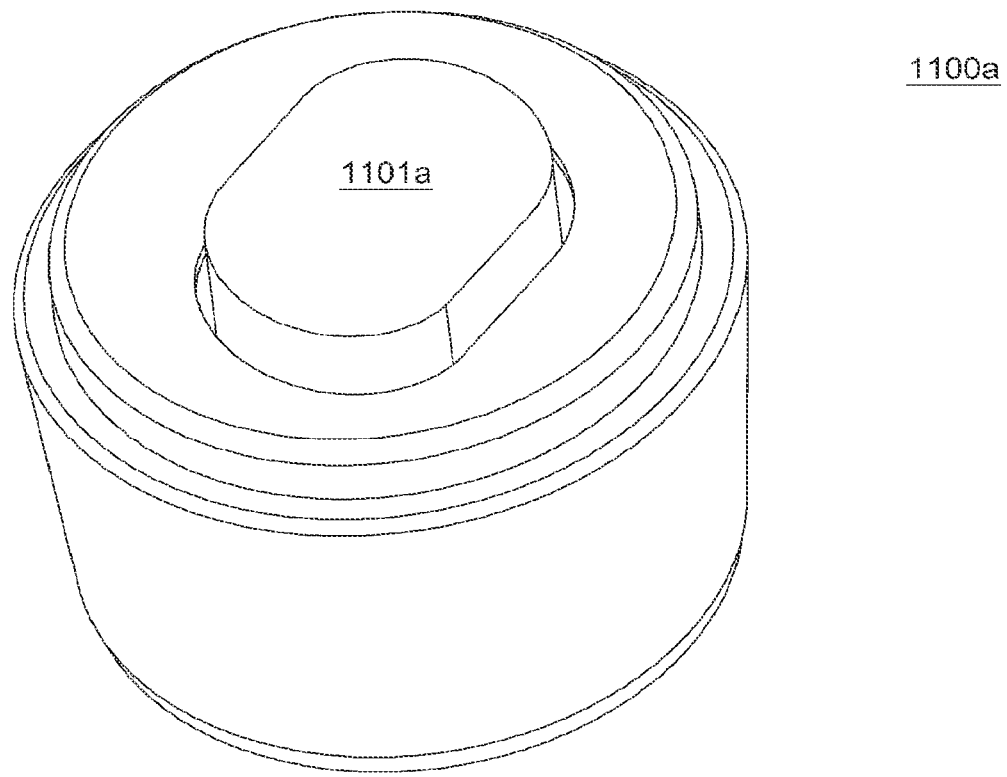
FIGS. 11a and 11b respectively depict an example of a single button embodiment of the invention and an example PCBA for such an embodiment.
Figure 11B:
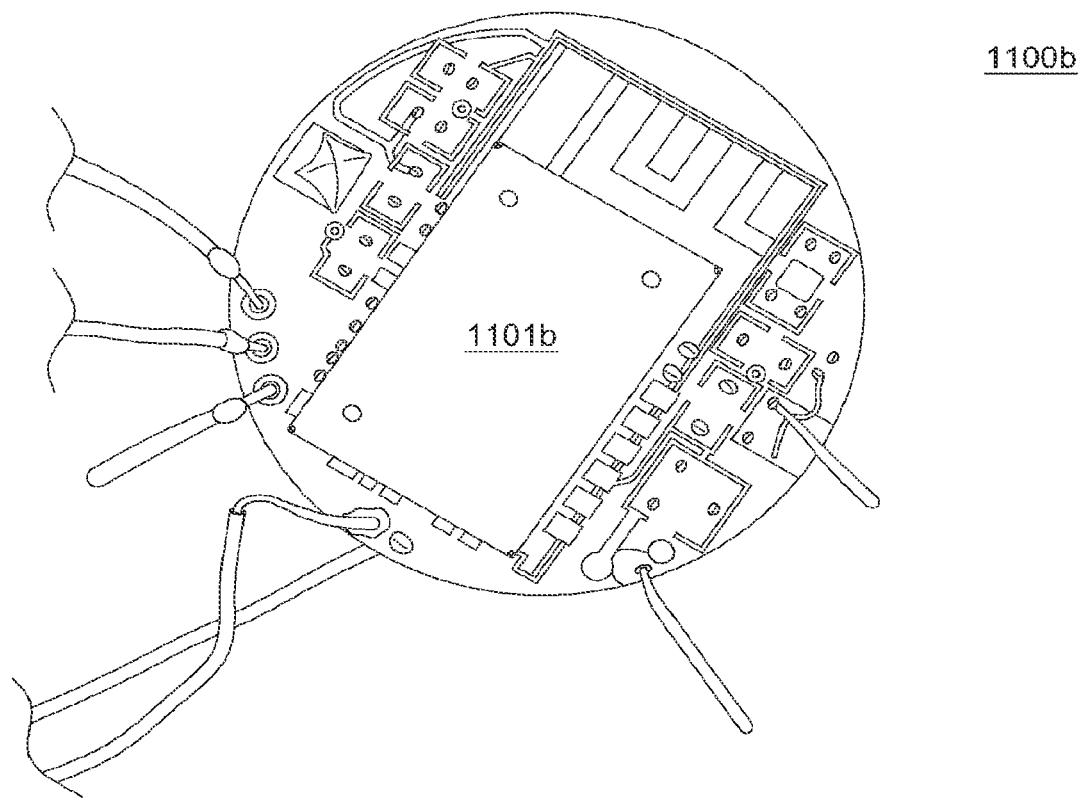

FIG. 11a is a top view of an example one button controller housing 1100a according to the invention. The single input button is shown at 1101a. FIG. 11b depicts a one button controller PCBA 1100b suitable for housing inside 1100a. The component 1101b is a wireless transceiver with integrated processor suitable for this particular embodiment of the invention. The sole input switch is not visible in 1100b as it is located on the other side of the PCBA.

Figure 12:
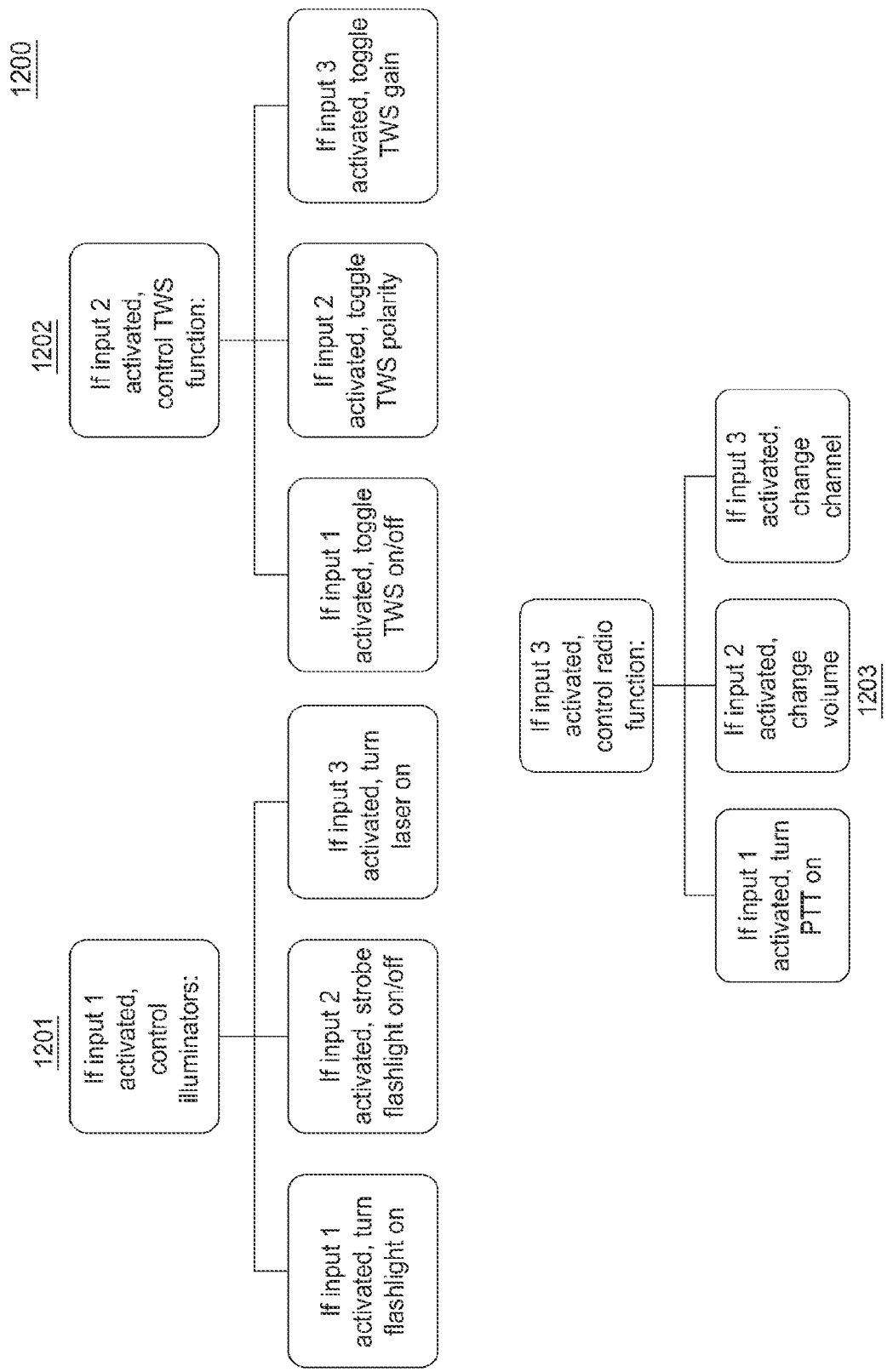
FIG. 12 is a series of flow charts expressing how the bandwidth of a three button controller can be expanded according to the invention.

FIG. 12 is a series of flow charts 1200 describing the process flow of a three button controller according to the invention, in which the bandwidth of the three inputs is expanded by processing the first activation of an input as a choice of which electronic device (or subset of electronic devices) to control, and the second input activation as a choice of which function to control on said device. Flow charts 1201, 1202 and 1203 respectively describe the processes followed when the first input activated is input 1, 2 and 3.

FIG. 13 is a series of flow charts 1300 describing the process flow of a one button controller according to the invention, in which the bandwidth of the single input is expanded by using the number and/or duration of input activations to determine the command generated by the processor. Flow charts 1301 and 1302 respectively describe the processes followed when the first input activated is a short press (a "dot") and a long press (a "dash").

Glossary

For the purposes of the present technology disclosure, in certain forms of the present technology, one or more of the following definitions may apply. In other forms of the present technology, alternative definitions may apply.

Activatable physical element: an electrical switch, surface or physical region which is capable of being activated by a user to generate an input (verb).

Combined input value: the summed value of all HMI inputs activated by a user at any given point in time. In some embodiments, a combined input value is accumulated by a HMI's processor in order to generate an output.

Controlled device: a device with at least one function that is controlled by an HMI system according to the invention.

Controller: a component of an HMI system according to the invention, comprising an activatable physical element and components such as electronics capable of executing, or initiating execution of, an output function on a controlled device.

Device controller: a component of an HMI system according to the invention, comprising components such as electronics capable of receiving a wireless command from a controller and executing that output command on a connected controlled device.

E5 device: an example interface according to the invention.

E6 device: an example interface according to the invention.

Element: an activatable physical element.

HMI: a controller.

HMI controller: a controller.

Input (noun): an activatable physical element.

Input (verb): a signal that is put into and operated on by a process or system.

Latency period: the elapsed time between an input or sequence of inputs being activated on an HMI controller according to the invention, and the controlled device executing the corresponding function.

Physically connected: any components which are in physical contact with each other, either via direct physical contact or indirect contact via any number of intermediate means such as cables, plugs and sockets, electrical conductors or otherwise, are physically connected.

Quad Pad: an example interface according to the invention.

Slidably: to slidably engage a surface is to touch and move over said surface while maintaining smooth continuous contact.

Slide Control: an example interface according to the invention.

Sub-input: a component of an input (verb).

Stick Control: an example interface according to the invention.

Wireless connector: a type of device controller.

Wirelessly connected: any components which are capable of transferring data to each other despite not being physically connected are wirelessly connected.

What is claimed is:

1. A human machine interface system for wirelessly controlling a device, the system comprising:
    a plurality of physical buttons configured to be depressed by a human digit, each assigned a unique input value;
    a processor in communication with the plurality of physical buttons, the processor configured to receive and process input values from of the plurality of buttons;
    a memory connected to the processor; and
    a communicator configured to communicate a command intended for the device output from the processor,
    wherein the processor is configured to:
        in response to detecting a change of input state for one or more of the plurality of physical buttons, (a) obtain a combined input value which is an accumulated value of one or more activated input values and (b) rewrite the memory to store the obtained combined input value and a predetermined number of past combined input values, and
        in response to an entry that matches a combination of the combined input values stored in the memory being found in a lookup table that specifies a predetermined correspondence between combinations of combined input values and commands, output a command corresponding to the entry based on the predetermined correspondence.

2. The system according to claim 1, further comprising a housing in or with which the plurality of buttons, the processor, the memory, and the communicator are all disposed.

3. The system according to claim 1, wherein the communicator communicates wirelessly or via a physical cable.

4. The system according to claim 3, wherein the wireless communication is achieved using one or more of Bluetooth, BLE, Z-wave, NFC, RFID, SigFox, ANT, or ANT+, and wherein the command is a non-data command comprising control information for controlling a switching component that includes a MOSFFT or relay device.

5. The system according to claim 1, wherein the human machine interface system is configured to act as (a) master for controlling the device and (b) slave during connection to another computer or processor for modifying its software or firmware configuration.

6. A computer implemented method of wirelessly controlling a device, comprising:
    receiving an input originating from a plurality of physical buttons depressible by a human digit, each assigned a unique input value;
    in response to detecting a change of input state for the plurality of physical buttons, (a) obtaining a combined input value which is an accumulated value of one or more activated input values, and (b) rewriting a memory to store the obtained combined input value and a predetermined number of past combined input values; and
    in response to an entry that matches a combination of the combined input values stored in the memory being found in a lookup table that specifies a predetermined correspondence between combinations of combined input values and commands, wirelessly communicating to the device a command corresponding to the entry based on the predetermined correspondence using a communicator.

7. The method according to claim 6, wherein the wireless communication is achieved using one or more of Bluetooth, BLE, Z-wave, NFC, RFID, SigFox, ANT, or ANT+, and wherein the command is a non-data command comprising control information for controlling a switching component having a MOSFET or relay device.

8. The method according to claim 6, wherein the communicator communicates to the device via physical cable.

9. The method according to claim 6, further comprising the steps of:
    processing a chronologically subsequent first and second input values to determine a subset of combined input values; and
    processing at least one chronologically subsequent input values to determine subsequent combined input values.

10. The method according to claim 9, wherein the chronologically subsequent first and second input values comprise an absence of activation of one of the plurality of physical buttons by the human digit over a predetermined time period.

11. The method according to claim 9, wherein a first processing step determines a selection of electronic device to control and a second processing step determines a command for that device.

12. The method according to claim 11, further comprising the steps of:
    recording a time of a first sub-input;
    monitoring an elapsed time after the first sub-input until it reaches a predetermined elapsed time value;
    if no subsequent sub-input is received before the predetermined elapsed time value, processing the absence of subsequent input as a predetermined input value.

13. The method according to claim 12, wherein the predetermined elapsed time value is less than about 2 seconds, less than about 1.5 seconds, less than about 1 second, optionally about 0.5 to 1 second, or is about 0.5 seconds.

14. A human machine interface system for controlling a device, the system comprising:
- a human machine interface; and
- a device controller in communication with the human machine interface and to execute a command on the device, wherein the human machine interface comprises:
- a housing;
- a plurality of depressible physical buttons, each assigned a unique input value;
- a processor in communication with the plurality of depressible physical buttons, and configured to receive and process an input from at least one of the plurality of depressible physical buttons;
- a memory connected to the processor; and
- a communicator configured to communicate an output from the processor, wherein the output comprises a command intended for the device, wherein the processor is configured to:
- in response to detecting a change of input state for the plurality of depressible physical buttons, (a) obtain a combined input value which is an accumulated value of one or more activated input values and (b) rewrite the memory to store the obtained combined input value and a predetermined number of past combined input values, and
- in response to an entry that matches a combination of the combined input values stored in the memory being found in a lookup table that specifies a predetermined correspondence between combinations of combined input values and commands, output a command corresponding to the entry based on the predetermined correspondence.

15. The system according to claim 14, wherein the plurality of depressible physical buttons are arranged in the housing so that each of the plurality of depressible physical buttons is depressed by a specific digit out of the five digits of the human hand.

16. The system according to claim 14, wherein the plurality of depressible physical buttons, the processor, the memory, and the communicator are all disposed about or within the housing or connected thereto.

17. The system according to claim 14, wherein the communicator communicates wirelessly or via a physical cable.

* * * * *

UNITED STATES PATENT AND TRADEMARK OFFICE
CERTIFICATE OF CORRECTION

PATENT NO. : 11,409,380 B2
APPLICATION NO. : 17/189158
DATED : August 9, 2022
INVENTOR(S) : William Boettcher et al.

It is certified that error appears in the above-identified patent and that said Letters Patent is hereby corrected as shown below:

In the Claims

At Column 25, Line 41, in Claim 1, delete "from of the" and insert -- from the --.

At Column 26, Line 4, in Claim 4, delete "MOSFFT" and insert -- MOSFET --.

Signed and Sealed this
Eighth Day of November, 2022

Katherine Kelly Vidal
*Director of the United States Patent and Trademark Office*